(12) United States Patent
Ishigaki et al.

(10) Patent No.: US 12,517,826 B2
(45) Date of Patent: Jan. 6, 2026

(54) INTERLEAVE CIRCUIT AND COMMUNICATION DEVICE

(71) Applicant: KABUSHIKI KAISHA TOSHIBA, Tokyo (JP)

(72) Inventors: Yutaro Ishigaki, Kawasaki Kanagawa (JP); Kazuaki Doi, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 106 days.

(21) Appl. No.: 18/173,940

(22) Filed: Feb. 24, 2023

(65) Prior Publication Data
US 2024/0061773 A1 Feb. 22, 2024

(30) Foreign Application Priority Data
Aug. 19, 2022 (JP) .................... 2022-131196

(51) Int. Cl.
*H03M 13/00* (2006.01)
*G06F 12/06* (2006.01)
*H03M 13/27* (2006.01)

(52) U.S. Cl.
CPC .... *G06F 12/0607* (2013.01); *H03M 13/2764* (2013.01)

(58) Field of Classification Search
None
See application file for complete search history.

(56) References Cited

U.S. PATENT DOCUMENTS

| 4,751,446 A * | 6/1988 | Pineda ............... G09G 5/06 348/44 |
| 4,769,790 A | 9/1988 | Yamashita |
| 6,476,738 B1 | 11/2002 | Mitsutani |
| 6,625,763 B1 | 9/2003 | Boner |

(Continued)

FOREIGN PATENT DOCUMENTS

| JP | S62-38075 A | 2/1987 |
| JP | 3288262 B2 | 6/2002 |

(Continued)

OTHER PUBLICATIONS

A. R. Dixon et al., "High Speed and adaptable error correction for megabit/s rate quantum key distribution," Scientific Reports, vol. 4, No. 7275, 6 pages, DOI: 10.1038/srep07275 (2014).

(Continued)

*Primary Examiner* — Mujtaba M Chaudry
(74) *Attorney, Agent, or Firm* — Finnegan, Henderson, Farabow, Garrett & Dunner, LLP

(57) ABSTRACT

According to an embodiment, an interleave circuit includes a reordering circuit and an address calculation circuit. The reordering circuit is configured to, for each cycle, receive in parallel input data containing n (n is an integer of 2 or more) bits, and reorder n-pieces of the input data input in n cycles into n-pieces of output data each containing n bits input in cycles different from each other. The address calculation circuit is configured to calculate write addresses for writing the n-pieces of output data into a first storage device and read addresses for reading out the n-pieces of output data from the first storage device.

6 Claims, 18 Drawing Sheets

(56) References Cited

U.S. PATENT DOCUMENTS

| | | | |
|---|---|---|---|
| 8,213,548 B2* | 7/2012 | Bai | H04L 27/2647 |
| | | | 375/316 |
| 9,048,877 B2* | 6/2015 | Wang | H03M 13/2957 |
| 2006/0203570 A1* | 9/2006 | Meier | G11C 7/1006 |
| | | | 365/189.05 |
| 2008/0270714 A1 | 10/2008 | Van Den Bosch | |
| 2013/0064252 A1 | 3/2013 | Takahashi | |
| 2015/0058704 A1* | 2/2015 | Schell | H03M 13/2732 |
| | | | 714/786 |
| 2016/0188523 A1* | 6/2016 | Teoh | G06F 13/1668 |
| | | | 710/105 |
| 2018/0131393 A1 | 5/2018 | Yamamoto et al. | |
| 2018/0314629 A1* | 11/2018 | Chen | G11C 16/08 |
| 2022/0012182 A1* | 1/2022 | Wei | G06F 12/0246 |
| 2022/0374348 A1* | 11/2022 | Hazel | G06F 12/0607 |
| 2023/0033774 A1* | 2/2023 | Koike-Akino | H04L 27/36 |

FOREIGN PATENT DOCUMENTS

| | | |
|---|---|---|
| JP | 2002-232300 A | 8/2002 |
| JP | 3549756 B2 | 8/2004 |
| JP | 4045017 B2 | 2/2008 |
| JP | 2008-530885 A | 8/2008 |
| JP | 2013-62736 A | 4/2013 |
| WO | WO 2006/085251 A2 | 8/2006 |

OTHER PUBLICATIONS

Japan Patent Office, Japanese Office Action in JP App. No. 2022-131196, (Jul. 10, 2025).

* cited by examiner

| REORDERING CIRCUIT OUTPUT ORDER | ADDRESS | DATA AFTER INTERLEAVE PROCESSING | | | |
|---|---|---|---|---|---|
| 1 | 0 | D0 | D4 | D8 | D12 |
| 5 | 1 | D16 | D20 | D24 | D28 |
| 9 | 2 | D32 | D36 | D40 | D44 |
| 13 | 3 | D48 | D52 | D56 | D60 |
| 2 | 4 | D1 | D5 | D9 | D13 |
| 6 | 5 | D17 | D21 | D25 | D29 |
| 10 | 6 | D33 | D37 | D41 | D45 |
| 14 | 7 | D49 | D53 | D57 | D61 |
| 3 | 8 | D2 | D6 | D10 | D14 |
| 7 | 9 | D18 | D22 | D26 | D30 |
| 11 | 10 | D34 | D38 | D42 | D46 |
| 15 | 11 | D50 | D54 | D58 | D62 |
| 4 | 12 | D3 | D7 | D11 | D15 |
| 8 | 13 | D19 | D23 | D27 | D31 |
| 12 | 14 | D35 | D39 | D43 | D47 |
| 16 | 15 | D51 | D55 | D59 | D63 |

FIG.16

| INPUT ORDER | ADDRESS | MEMORY WRITE DATA | | | |
|---|---|---|---|---|---|
| 1 | 0 | D0 | D4 | D8 | D12 |
| 5 | 1 | D1 | D5 | D9 | D13 |
| 9 | 2 | D2 | D6 | D10 | D14 |
| 13 | 3 | D3 | D7 | D11 | D15 |
| 2 | 4 | D16 | D20 | D24 | D28 |
| 6 | 5 | D17 | D21 | D25 | D29 |
| 10 | 6 | D18 | D22 | D26 | D30 |
| 14 | 7 | D19 | D23 | D27 | D31 |
| 3 | 8 | D32 | D36 | D40 | D44 |
| 7 | 9 | D33 | D37 | D41 | D45 |
| 11 | 10 | D34 | D38 | D42 | D46 |
| 15 | 11 | D35 | D39 | D43 | D47 |
| 4 | 12 | D48 | D52 | D56 | D60 |
| 8 | 13 | D49 | D53 | D57 | D61 |
| 12 | 14 | D50 | D54 | D58 | D62 |
| 16 | 15 | D51 | D55 | D59 | D63 |

| REORDERING CIRCUIT OUTPUT ORDER | ADDRESS | SMALL-CAPACITY MEMORY ADDRESS | MEMORY | DATA AFTER INTERLEAVE PROCESSING | | | |
|---|---|---|---|---|---|---|---|
| 1 | 0 | 0 | MA | D0 | D4 | D8 | D12 |
| 5 | 1 | 1 | MA | D16 | D20 | D24 | D28 |
| 9 | 2 | 0 | MB | D32 | D36 | D40 | D44 |
| 13 | 3 | 1 | MB | D48 | D52 | D56 | D60 |
| 2 | 4 | 2 | MA | D1 | D5 | D9 | D13 |
| 6 | 5 | 3 | MA | D17 | D21 | D25 | D29 |
| 10 | 6 | 2 | MB | D33 | D37 | D41 | D45 |
| 14 | 7 | 3 | MB | D49 | D53 | D57 | D61 |
| 3 | 8 | 4 | MA | D2 | D6 | D10 | D14 |
| 7 | 9 | 5 | MA | D18 | D22 | D26 | D30 |
| 11 | 10 | 4 | MB | D34 | D38 | D42 | D46 |
| 15 | 11 | 5 | MB | D50 | D54 | D58 | D62 |
| 4 | 12 | 6 | MA | D3 | D7 | D11 | D15 |
| 8 | 13 | 7 | MA | D19 | D23 | D27 | D31 |
| 12 | 14 | 6 | MB | D35 | D39 | D43 | D47 |
| 16 | 15 | 7 | MB | D51 | D55 | D59 | D63 |

INTERLEAVE CIRCUIT AND COMMUNICATION DEVICE

CROSS-REFERENCE TO RELATED APPLICATIONS

This application is based upon and claims the benefit of priority from Japanese Patent Application No. 2022-131196, filed on Aug. 19, 2022; the entire contents of which are incorporated herein by reference.

FIELD

Embodiments described herein relate generally to an interleave circuit and a communication device.

BACKGROUND

Error correction techniques are essential for communications involving Quantum Key Distribution (QKD) using light quanta. In error correction techniques, a technique called Rate Adaptation is effective for improving information transmission speed and stabilizing error correction. However, non-uniform error rates in a wide range of data and occurrence of block errors increase the possibility of failing error correction.

To ensure stable operation of error correction and improve information transmission speed, it is effective to perform block interleave processing in which the bit orders are swapped within a block sectioned by a predetermined number of bits.

However, conventional techniques have problems in regards to reduction in throughput or difficulty in circuit implementation. An object of embodiments is to provide an interleave circuit and a communication device, which can be implemented with a practical circuit configuration while suppressing reduction in throughput.

BRIEF DESCRIPTION OF THE DRAWINGS

FIG. 16 is a chart illustrating an example of data written into a memory;

DETAILED DESCRIPTION

In general, according to an embodiment, an interleave circuit includes a reordering circuit and an address calculation circuit. The reordering circuit is configured to, for each cycle, receive in parallel input data containing n (n is an integer of 2 or more) bits, and reorder n-pieces of the input data input in n cycles into n-pieces of output data each containing n bits input in cycles different from each other. The address calculation circuit is configured to calculate write addresses for writing the n-pieces of output data into a first storage device and read addresses for reading out the n-pieces of output data from the first storage device.

Exemplary embodiments of an interleave circuit and a communication device will be explained below in detail with reference to the accompanying drawings. The present invention is not limited to the following embodiments.

As described above, with the conventional interleaving techniques, throughput may be reduced or circuit implementation may become difficult in some cases. For example, an example of a configuration of a conventional interleave circuit, there is a configuration where a large number of bits cannot be input simultaneously and data reordering is performed at a low throughput such as in 1-bit/cycle. Furthermore, when the size of a block (block size) is large, the conventional techniques require an enormous number of flip-flops or require a large word size of memory for operating at a high throughput, thereby making circuit implementation difficult.

Therefore, the following embodiments achieve an interleave circuit and a communication device, which can be implemented with a practical circuit configuration while suppressing reduction in the throughput, even when the block size is large, for example.

First Embodiment

Figure 1:
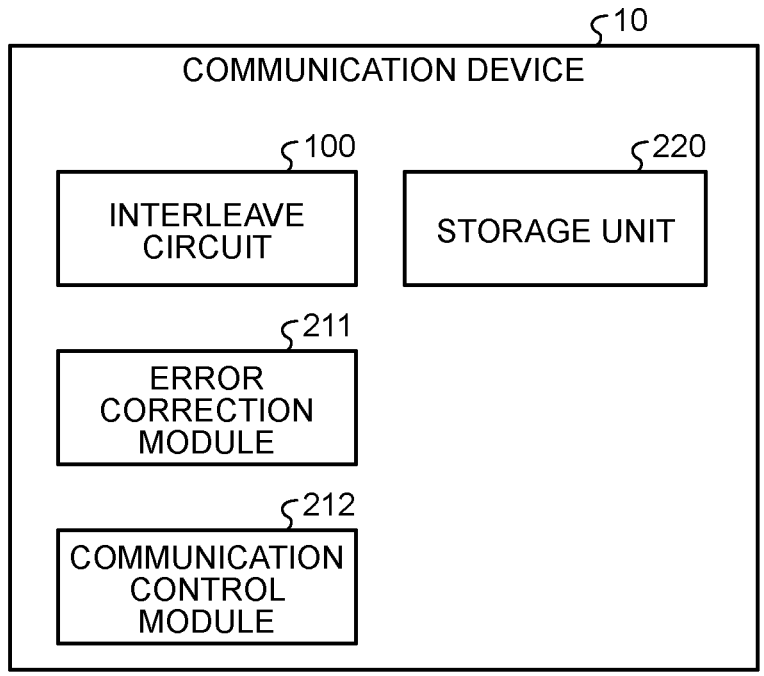
FIG. 1 is a block diagram of a communication device according to a first embodiment.

FIG. 1 is a block diagram illustrating an example of a configuration of a communication device 10 according to a first embodiment. As illustrated in FIG. 1, the communication device 10 includes an interleave circuit 100, an error correction module 211, a communication control module 212, and a storage unit 220.

The interleave circuit 100 inputs data used for communication and outputs output data reordered from the data input thereto (input data). For example, the interleave circuit 100 executes block interleave processing, which reorders the data within a block for each block of a predetermined block size.

The error correction module 211 executes error correction on the output data reordered by the interleave circuit 100. In the present embodiment, the interleave circuit 100 executes block interleave processing before error correction, which makes it possible to suppress non-uniform error rates and reduce the possibility of failing error correction.

The communication control module 212 controls communication using output data. For example, the communication control module 212 transmits output data to an external communication device that is a communicating party. Note that the output data may need to go through processing for reordering the output data in the original order (deinterleaving) in the external communication device. An example of a configuration of a deinterleave circuit that performs deinterleaving will be described later.

The storage unit 220 stores therein various kinds of data used in the communication device 10. For example, the storage unit 220 stores therein input data and output data. The storage unit 220 may be configured with various types of storage media used in general, such as a flash memory, a memory card, a random-access memory (RAM), a hard disk drive (HDD), and an optical disc.

Each of the above-described units (the error correction module 211, the communication control module 212) can be implemented by one or more processors, for example. For example, each of the above-described units may be implemented by executing a computer program with a processor such as a central processing unit (CPU), that is, may be implemented by software. Each of the above-described units may be implemented by a processor such as a dedicated integrated circuit (IC), that is, may be implemented by hardware. Each of the above-described units may be implemented by using software and hardware in combination. In a case of using a plurality of processors, each of the processors may implement one of the units or two or more of the units.

Figure 2:
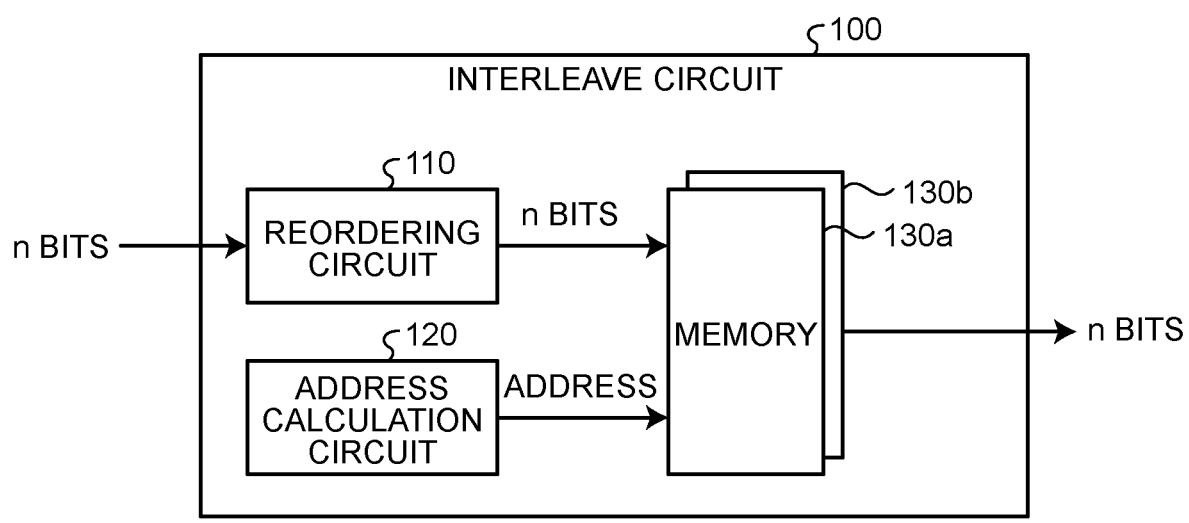
FIG. 2 is a block diagram of an interleave circuit according to the first embodiment.

Next, an example of the configuration of the interleave circuit 100 will be described. FIG. 2 is a block diagram illustrating an example of the configuration of the interleave circuit 100. The interleave circuit 100 includes a reordering circuit 110, an address calculation circuit 120, and memories 130$a$ and 130$b$.

The reordering circuit 110 outputs, for each of input data of n×n bits, output data reordered from the input data in an order different from the input bit order. For example, for each cycle, the reordering circuit 110 receives in parallel input data containing n (n is an integer of two or more) bits, and reorders and outputs n-pieces of input data input in n cycles into n-pieces of output data each containing n bits input in cycles different from each other.

The memories 130$a$ and 130$b$ are storage devices (examples of a first storage device) that store therein the output data reordered by the reordering circuit 110. The interleave circuit 100 according to the present embodiment is configured to have the two memories 130$a$ and 130$b$ of a size that can store one block of data. The memories 130$a$ and 130$b$ store therein data in a unit (one word) of n bits, for example. In other words, the word size of the memories 130$a$ and 130$b$ is n bits.

The interleave circuit 100 performs a double buffer operation in which the memory used for writing (a write memory) and the memory used for reading (a read memory) are switched between the two memories 130$a$ and 130$b$ for each block. Hereinafter, the memories 130$a$ and 130$b$, when it is not necessary to distinguish between the two, are simply referred to as the memory 130.

The address calculation circuit 120 calculates write addresses for writing n-pieces of output data to the memory 130 and read addresses for reading n-pieces of output data from the memory 130.

Figure 3:
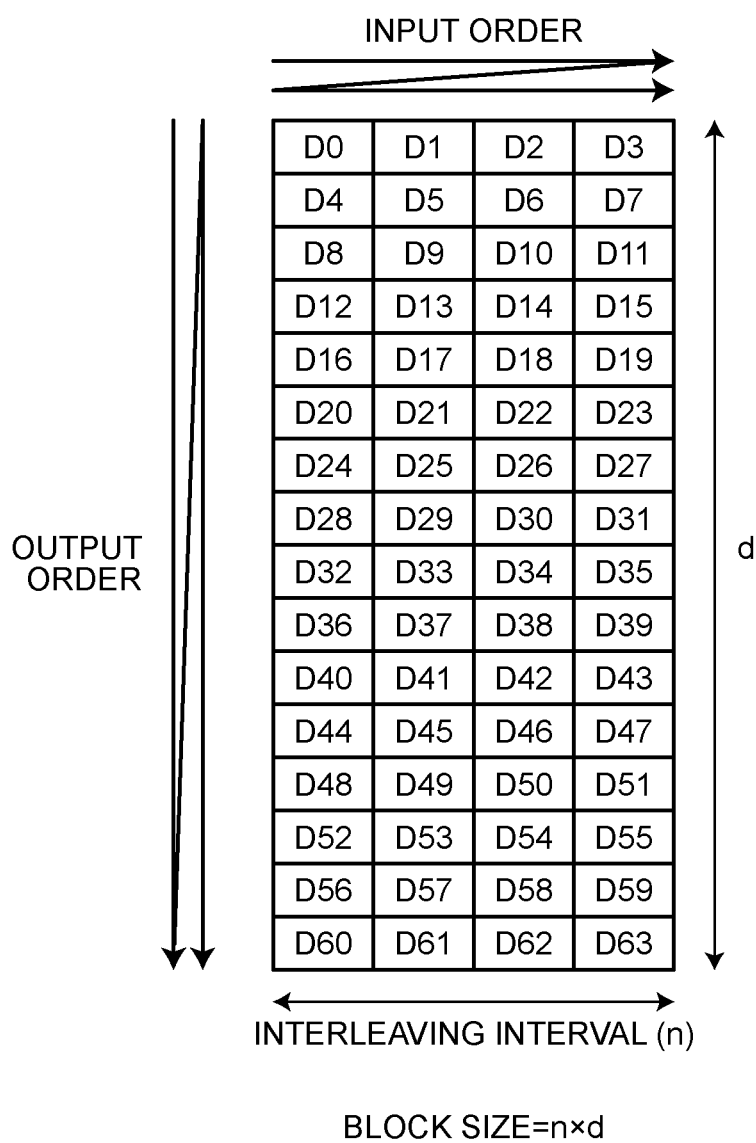
FIG. 3 is a diagram illustrating an example of block interleave processing.

Next, an example of block interleave processing will be described. FIG. 3 is a diagram illustrating an example of the block interleave processing. Each piece of data from D0 to D63 represents 1-bit data. Those pieces of data are reordered as a single block. In other words, in this example, the block size is 64 bits. Note that the block size is not limited thereto, and may be larger than 64 bits or smaller than 64 bits.

An interval at which reordering is performed is defined as an interleaving interval, which is denoted by the number of bits "n". FIG. 3 illustrates an example where the interleaving interval n is 4. When it is assumed that the number of pieces of n-bit (4-bit when n=4) input data in a block is d, the block size can also be expressed as n×d. Note that the interleaving interval n is not limited to 4, but may take any values. For example, the interleaving interval n may be set to about 512 in order to ensure uniform error rates for practical use.

Input data is input in the order of D0, D1, D2, D3, D4, and so on. Output data after reordering is output in the order such as D0, D4, D8, D12, D16, . . . , D60, D1, D5, and so on. As described, in the present embodiment, the data is reordered in the block to be output in an order different from the input order.

In the present embodiment, input data is reordered in a unit of n×n bits. In FIG. 3, when input data of 16 bits (4×4 bits) from D0 to D15 is input, for example, the 16-bit input data is reordered. Hereinafter, the number of pieces of data in a unit of n×n bits within a block is denoted by N. In the example of FIG. 3, N=4 (=64/16).

Figure 4:
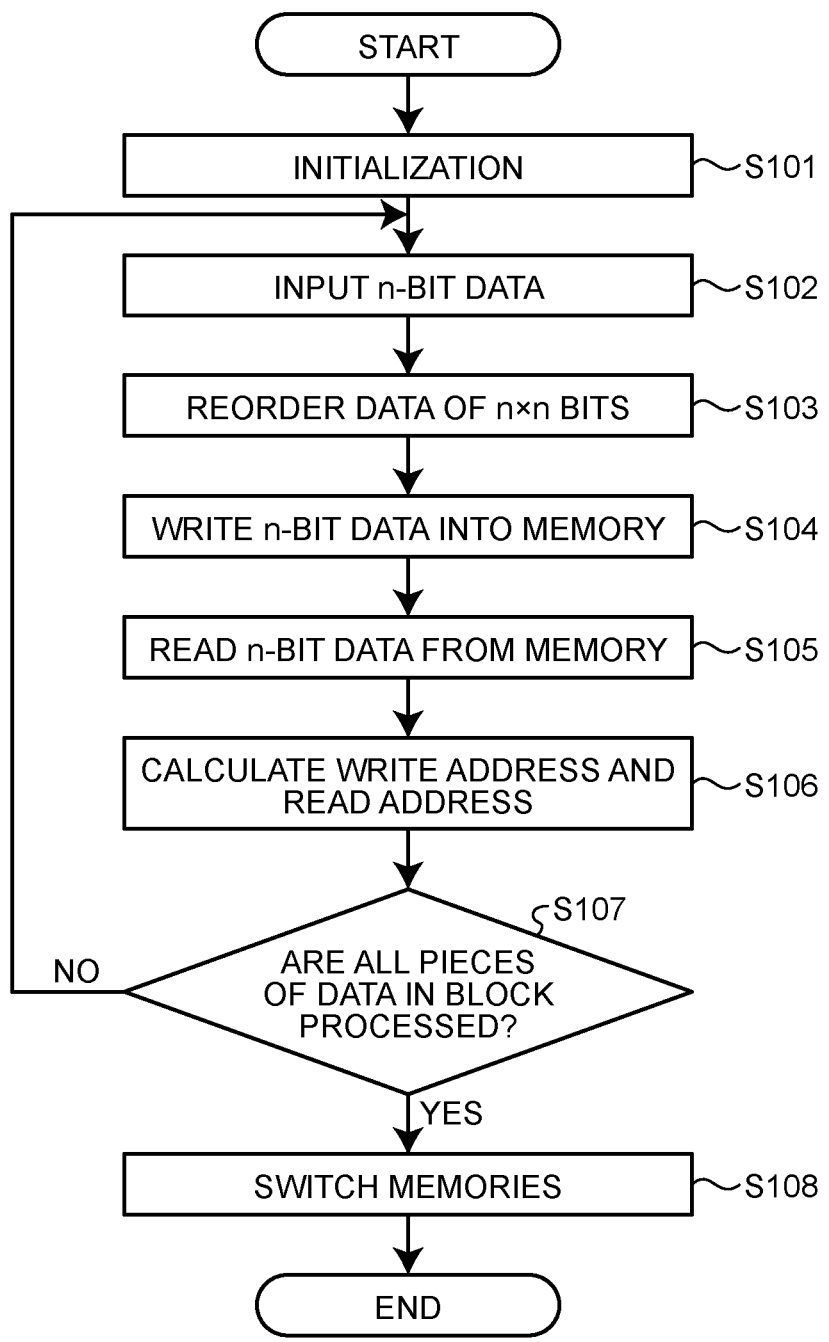
FIG. 4 is a flowchart of the interleave circuit according to the first embodiment.

Next, operations of the interleave circuit 100 according to the first embodiment will be described. FIG. 4 is a flowchart illustrating an operation example of the interleave circuit 100 according to the first embodiment. FIG. 4 illustrates an example of an operation when processing a single block.

At the start of operation, the interleave circuit 100 initializes internal signals, write addresses, and read addresses (step S101). Thereafter, data is reordered while sequentially inputting n-bit input data (step S102 to step S106).

In the present embodiment, input data is input at a throughput of n-bits/cycle. Furthermore, since the input data for n cycles is not yet input from 1 cycle to (n−1) cycles after the initialization (step S101), reordered output data is not output. After the input data of at least n cycles is input, reordered n-bit output data is output. An example of processing to be performed after input data for the n cycles (n cycles and thereafter) will be described below.

First, the reordering circuit 110 receives n-bit input data (step S102). The reordering circuit 110 reorders the input data in a unit of n×n bits using the input data input at step S102 and the input data already input in the past, and outputs n-bit output data that is part of the reordering result (step S103).

The reordering circuit 110 writes the n-bit output data into the write memory according to the write address calculated by the address calculation circuit 120 (step S104).

The interleave circuit 100 reads out and outputs the n-bit data from the read memory in which the reordered output data is stored, according to the read address calculated by the address calculation circuit 120 (step S105).

The order of the output data output from the reordering circuit 110 is different from the data order of the entire block. Therefore, the address calculation circuit 120 calculates and updates the write address of the output data using the following address calculation formula (step S106).

Write address=j×N+k j: Bit positions of n bits in output data (0≤j≤n−1)

N: Number of pieces of n×n-bit data k: Position of n×n-bit data within block (0≤k≤N−1)

The address calculation circuit 120 also calculates the read address of the output data by incrementing by 1 from 0 as the initial value, for example. Note that the calculation methods of write address and read address may be switched. For example, the address calculation circuit 120 may calculate the read address by the above address calculation formula and the write address by incrementing from the initial value. As described, the address calculation circuit 120 may calculate each of the addresses by any method as long as it is a method that calculates the write addresses and the read addresses such that each of the n-pieces of output data is output from the memory 130 in n consecutive cycles.

The interleave circuit 100 may perform pipeline processing for a series of such processing (step S102 to step S106). This allows each of the steps to be processed in one cycle for each n-bit data.

The interleave circuit 100 determines whether all pieces of data in the block are processed (step S107). When all pieces of data in the block are not processed (No at step S107), the interleave circuit 100 returns to step S102 and repeats the processing for the next n-bit input data.

When all pieces of data are processed (Yes at step S107), the interleave circuit 100 switches the memory used for writing (the write memory) and the memory used for reading (the read memory) between the two memories 130a, 130b (step S108), and ends the operation.

In this manner, in the present embodiment, it is possible to perform reordering processing at a rate of n-bits/cycle by outputting the reordered data while reordering data of one block.

Figure 5:
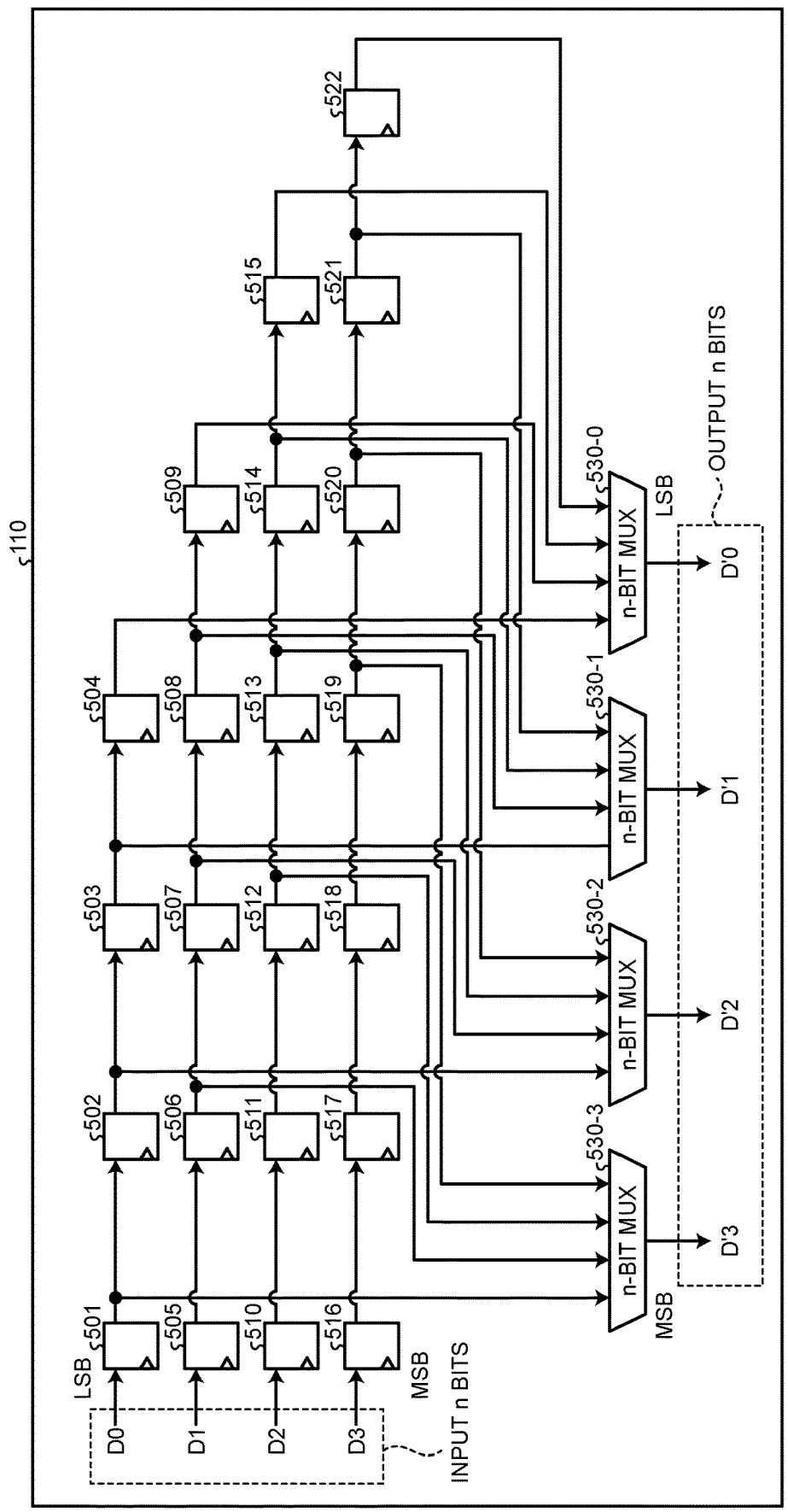
FIG. 5 is a diagram illustrating an example of a configuration of a reordering circuit.

Next, an example of the configuration of the reordering circuit 110 will be described. FIG. 5 is a diagram illustrating an example of the configuration of the reordering circuit 110. As described in FIG. 3, FIG. 5 is an example of the circuit configuration for performing block interleave processing when the interleaving interval n is set to be 4 bits.

As illustrated in FIG. 5, the reordering circuit 110 receives input data (for example, D0 to D3) of n bits (4 bits in the example of FIG. 5), and outputs output data (for example, D'0 to D'3) of n bits. In the example of FIG. 5, the least significant bit (LSB) of the input data is D0, and the most significant bit (MSB) of the input data is D3. Furthermore, the least significant bit of the output data is D'0, and the most significant bit of the output data is D'3.

The reordering circuit 110 includes flip-flops 501 to 522 (examples of register) and n (four in the example of FIG. 5) n-bit multiplexers (MUXes) 530-0 to 530-3 (examples of selection circuit).

The n-bit MUXes 530-0 to 530-3 are n-bit data selection circuits that select and output one of the n bits of the data. The data containing the output of each of the n-bit MUXes 530-0 to 530-3 is the n-bit output data.

When the output data is 4 bits (n=4), each of the n-bit MUXes 530-0 to 530-3 selects a bit at the jth bit position of the output data. Hereinafter, the n-bit MUX that selects the bit at the jth bit position may be referred to as the n-bit MUX 530-j.

The flip-flops 501 to 522 are configured to function as a shift register of (n+i) stages or more for the respective ith (0≤i≤n−1) bit positions of the input data.

Hereinafter, an example of configuring a shift register of (n+i) stages for each of the ith bit positions of the input data will be described. While it is desired to have a smaller number of registers (flip-flops), the shift register may be configured to have a greater number of stages than (n+i) stages, taking into account the efficiency and the like of the circuit layout. The minimum number of flip-flops, Nff, can be calculated by the following formula (1).

$$Nff = n \times n + \sum_{i=0}^{n-1} i \tag{1}$$

In the example of FIG. 5, for the 0th bit position of the input data, a four-stage shift register is configured with four flip-flops 501 to 504. In the first cycle, D0 is input and stored in the flip-flop 501. Thereafter, in the second through fourth cycles, D0 is sequentially shifted and stored in the flip-flops 502 to 504, respectively.

The inputs of the n-bit MUX 530-j are connected to the outputs of the (n−j+i)th stage flip-flops of the ith bit of the input data. The n-bit MUX 530-j, for example, in each of the n consecutive cycles, selects and outputs the bit stored in any one of mutually different flip-flops among the connected n flip-flops according to an indicated selection signal.

For example, every time n-bit input data is input, the reordering circuit 110 switches the selection signal that indicates which bit each of the n-bit MUXes 530-j is to select. Thereby, a reordering operation of n×n-bit input data can be achieved.

For example, the n-bit MUX 530-2 is connected to the outputs of the second-stage flip-flop 502 of the input D0 (i=0), the third-stage flip-flop 507 of the input D1 (i=1), the fourth-stage flip-flop 513 of the input D2 (i=2), and the fifth-stage flip-flop of the input D3 (i=3) 520. The reordering circuit 110 defines signals for indicating selection of the bits input from the flip-flops 502, 507, 513, and 520, for example, as selection signals 0, 1, 2, and 3, respectively. The n-bit MUX 530-2 selects and outputs the bits stored in the flip-flops 502, 507, 513, and 520 according to the selection signals 0, 1, 2, and 3 indicated in four consecutive cycles.

An example of the reordering operation performed by the reordering circuit 110 will be described by referring to FIG. 6 to FIG. 11.

Figure 6:
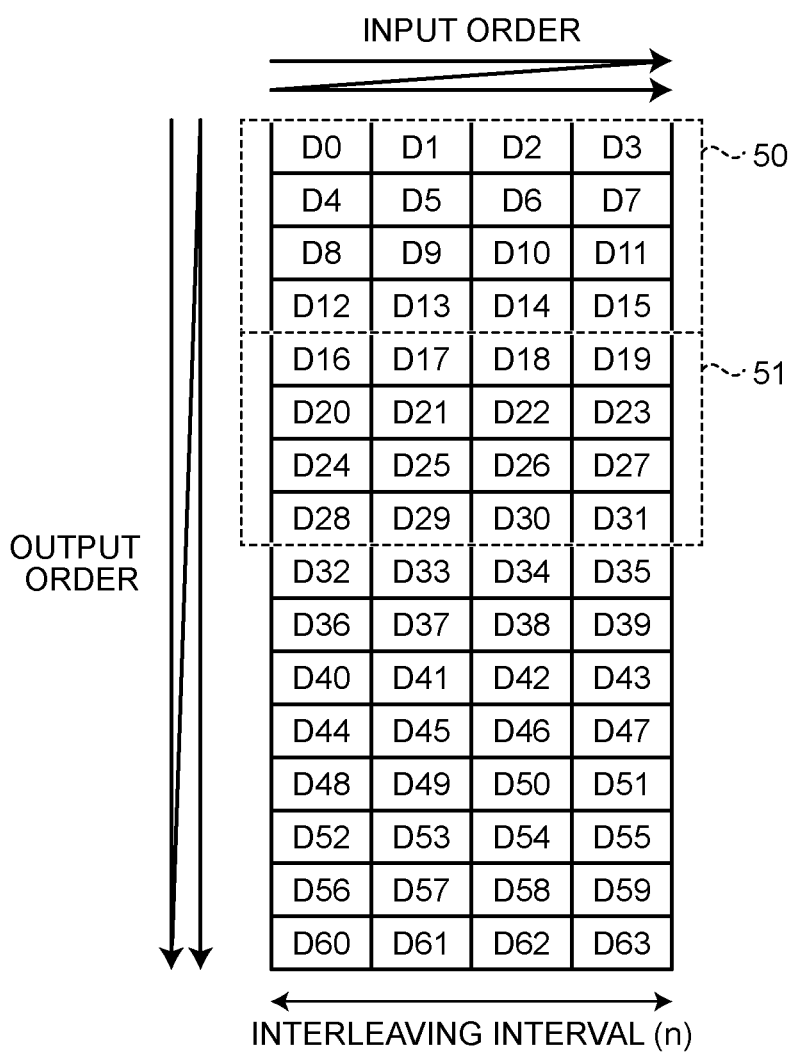
FIG. 6 is a diagram illustrating an example of input data.

FIG. 6 is a diagram illustrating an example of input data. FIG. 7 to FIG. 10 are diagrams illustrating the states after four cycles, five cycles, six cycles, and seven cycles from the start of processing, respectively. FIG. 11 is a diagram illustrating an example of input data and output data after reordering.

Figure 7:
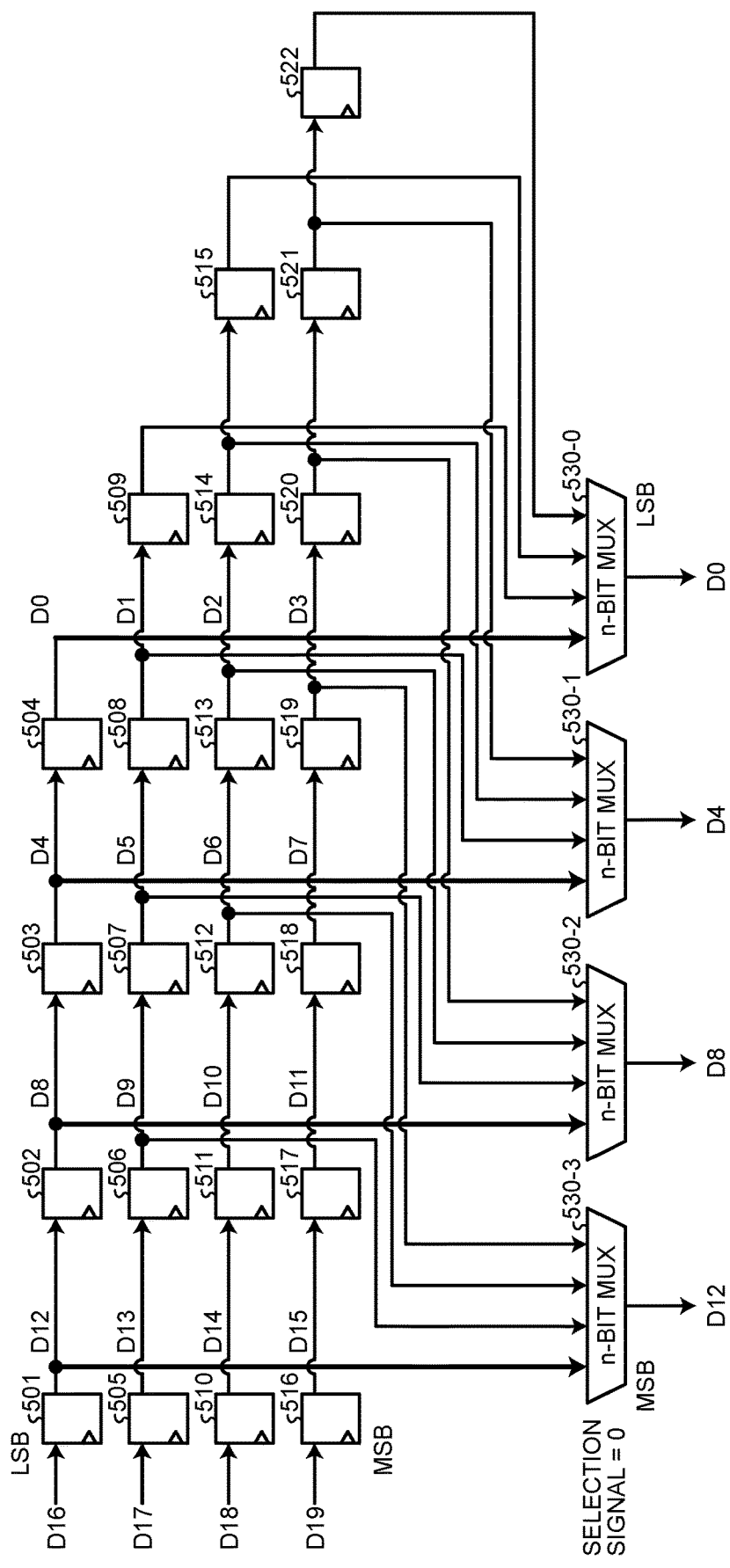
FIG. 7 is a diagram illustrating a state where four cycles have elapsed since processing is started.

When the input data illustrated in FIG. 6 is sequentially input, after four cycles, n×n bits of data 50 (D0 to D15) are stored in the shift register as illustrated in FIG. 7. The reordering circuit 110 outputs the data of D0, D4, D8, and D12 by setting the selection signal of the n-bit MUX 530-j to 0.

The reordering circuit 110 can input n bits of data (D16 to D19) from the next n×n bits of data 51 in the same cycle. As described, it is possible to perform reordering processing of the n×n-bit data continuously without a pause.

Figure 8:
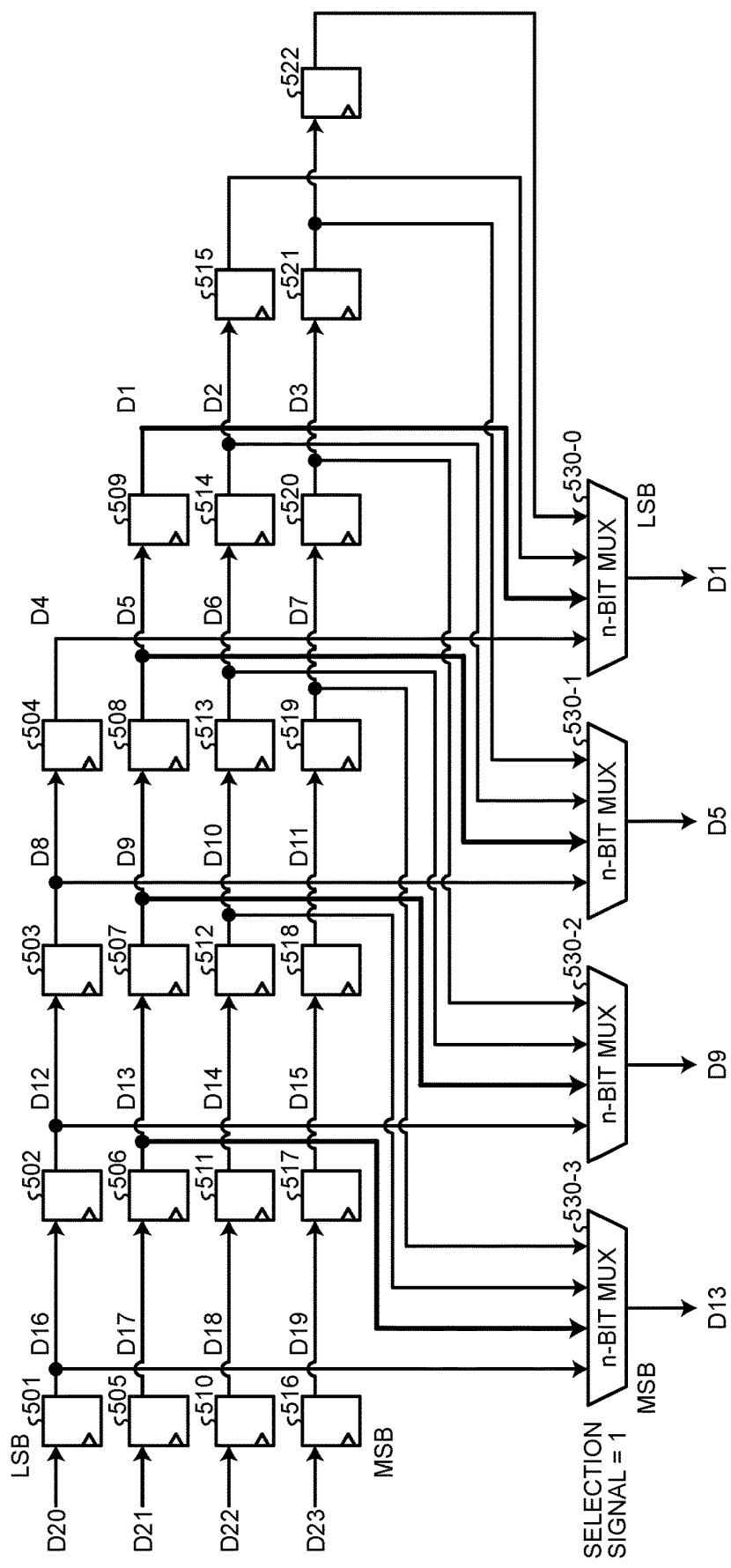
FIG. 8 is a diagram illustrating a state where five cycles have elapsed since processing is started.
Figure 9:
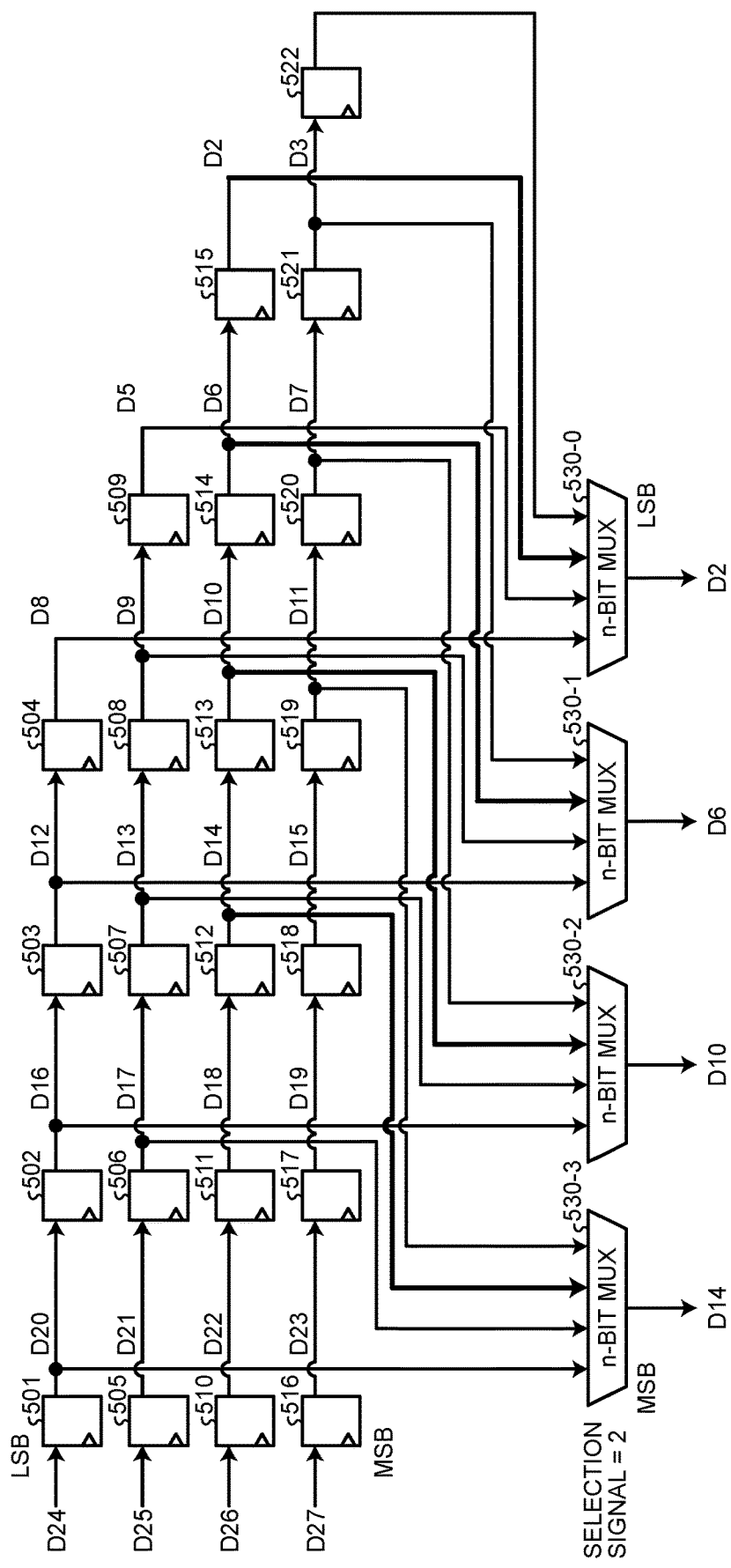
FIG. 9 is a diagram illustrating a state where six cycles have elapsed since processing is started.
Figure 10:
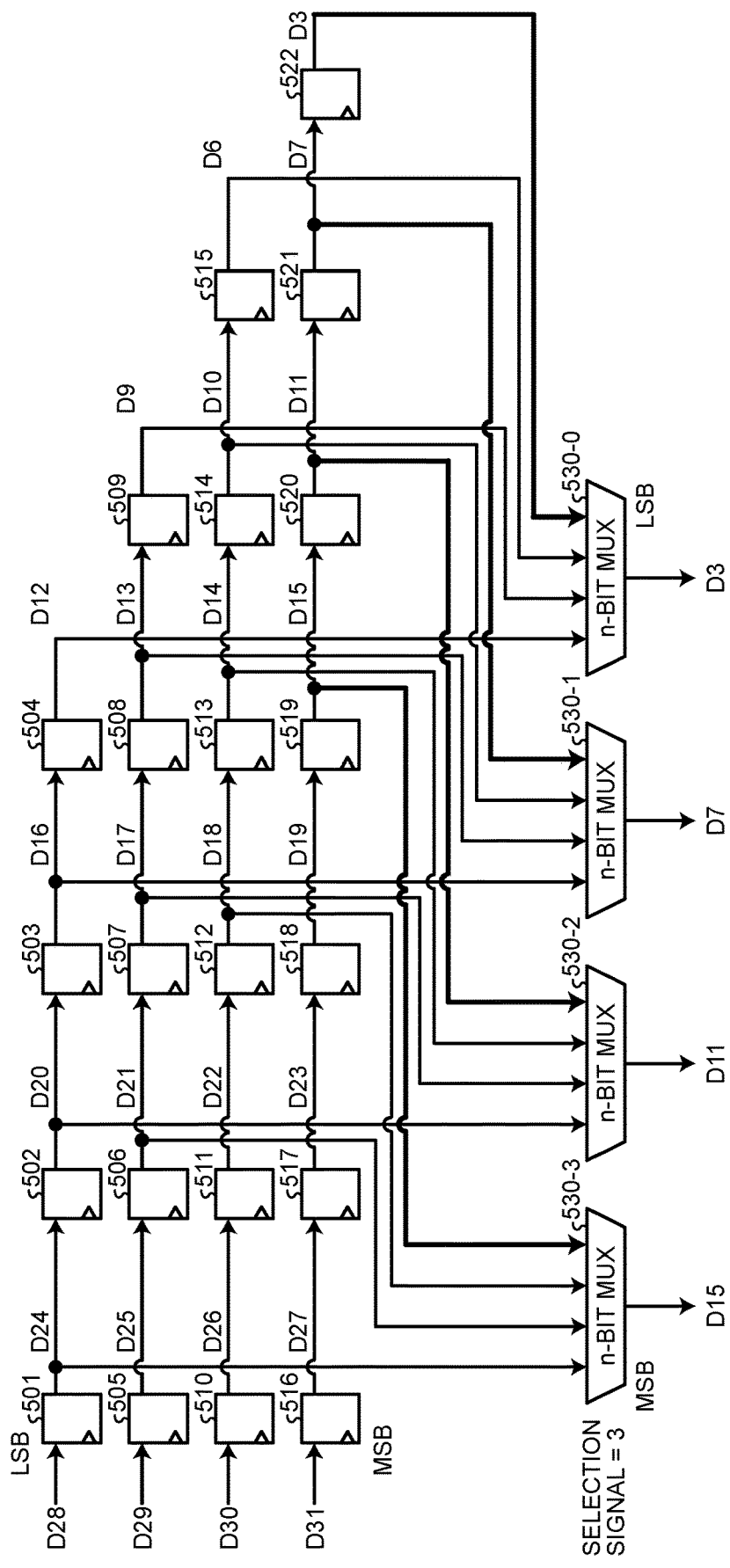
FIG. 10 is a diagram illustrating a state where seven cycles have elapsed since processing is started.
Figure 11:
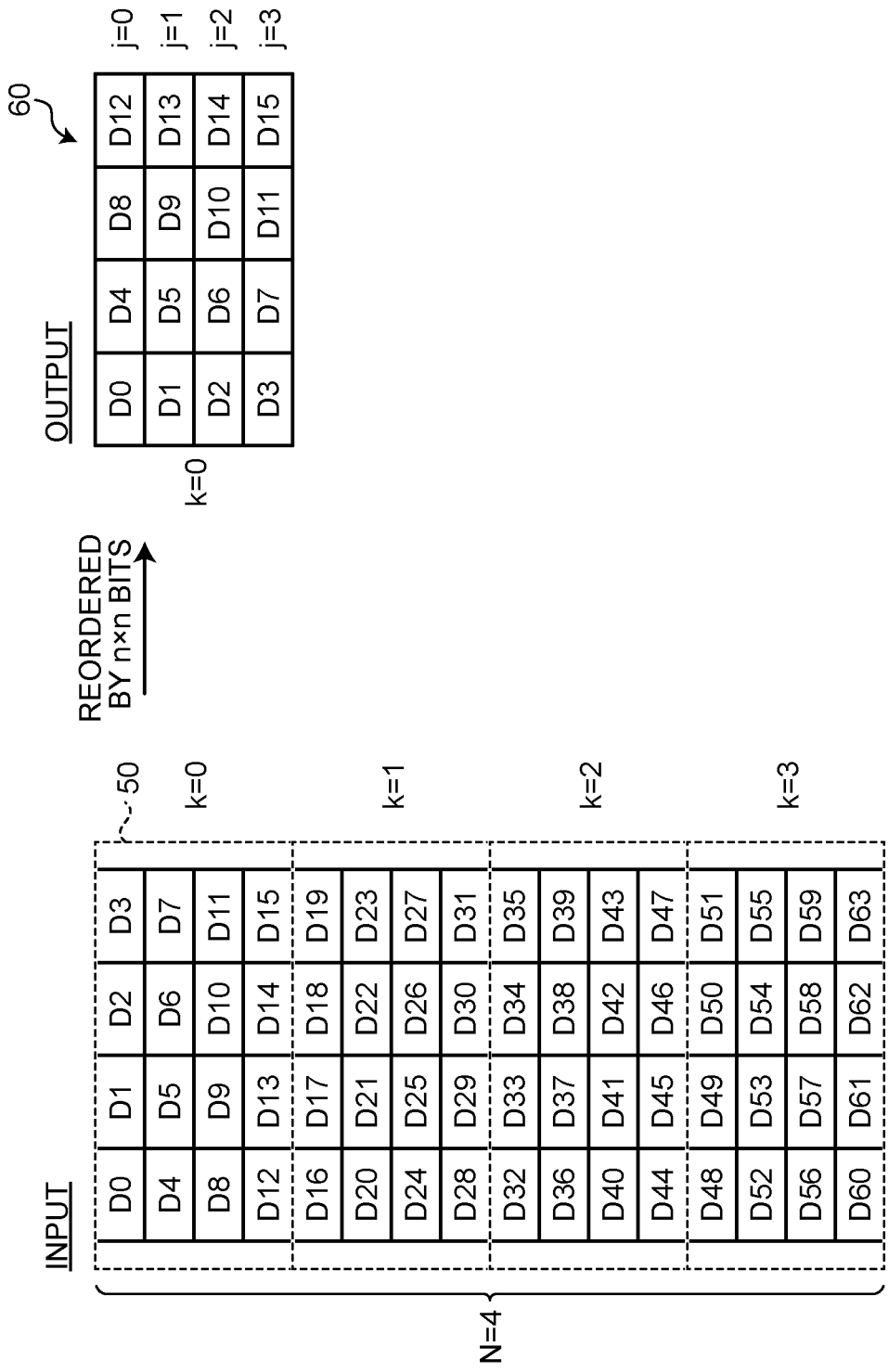
FIG. 11 is a diagram illustrating an example of input data and output data after reordering.

In the same manner, the reordering circuit 110 can reorder data within a data unit of n×n bits by switching the selection signal while shifting the data (FIG. 8 to FIG. 10). In FIG. 8, for example, the data D1, D5, D9, and D13 selected according to the selection signal 1 are output. In FIG. 9, the data D2, D6, D10, and D14 selected according to the selection signal 2 are output. In FIG. 10, the data D3, D7, D11, and D15 selected according to the selection signal 3 are output.

FIG. 11 includes an example of output data 60 acquired by reordering the input data illustrated in FIG. 6. The output data 60 corresponds to reordered data of the data 50 illustrated in FIG. 6.

Thereafter, the reordering circuit 110 again sets the selection signal to 0 and repeats the same processing for the next n×n-bit data (data 51 in FIG. 6). Thereby, reordering in a unit of n×n bits is executed consecutively.

Figures 12, 13:
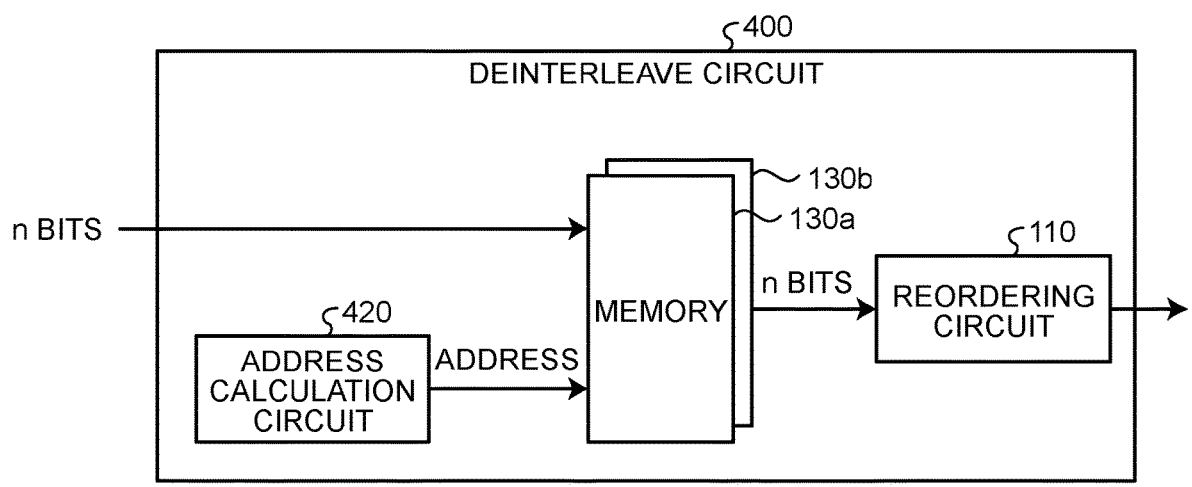
FIG. 12 is a chart illustrating relationships regarding output order, addresses, and data.
FIG. 13 is a block diagram of a deinterleave circuit.

The output data output from the reordering circuit 110 is output in an order different from the data order (input order) of the entire block. FIG. 12 is a chart illustrating relationships regarding the output order of output data, addresses of the memory 130, and the data after being interleave-processed.

The reordered output data is output by a unit of n bits from the reordering circuit 110. For example, the n-bit output data reordered from the input data illustrated in FIG. 11 is output in the order indicated in the column of the reordering circuit output order in FIG. 12. The address calculation circuit 120 calculates the write address of the output data to be the value indicated in the address column of FIG. 12. For example, the address calculation circuit 120 calculates the write address using the above address calculation formula.

This allows the output data to be stored in the memory 130 to be in the output order indicated in FIG. 3. Note that the addresses indicated in FIG. 12 are calculated on an assumption that the word size of the memory 130 is n bits.

For example, the data whose reordering circuit output order number is 4 is the data acquired by reordering the data in a unit of n×n bits corresponding to k=0 in FIG. 11. Within the reordered output data 60 (FIG. 11), the bit position j of the data corresponding to the data whose reordering circuit output order number is 4, is 3. Furthermore, as illustrated in FIG. 11, the number N of pieces of data in a unit of n×n bits is 4. Therefore, the address calculation circuit 120 can calculate the write address as j×N+k=3×4+0=12 by the above address calculation formula.

When the number of pieces of data in a unit of n×n bits is a power of 2, the address calculation circuit 120 may calculate the address by bit concatenation instead of multiplication, with the upper bit side being the position in the data in a unit of n×n bits and the lower bit side being the position in the data in a unit of n×n bits. This makes it possible to reduce the scale of the circuit.

Next, an example of a configuration of the deinterleave circuit will be described. A deinterleave circuit may be provided in an external communication device communicating with the communication device 10 or may be provided in the communication device 10. FIG. 13 is a block diagram illustrating an example of a configuration of a deinterleave circuit 400. The deinterleave circuit 400 includes a reordering circuit 110, an address calculation circuit 420, and memories 130a, 130b. Compared to the interleave circuit 100, the deinterleave circuit 400 has the configuration in which layout of the reordering circuit 110, the address calculation circuit 420, and the memories 130a, 130b is changed.

Since the structures of the reordering circuit 110 and the memories 130a, 130b are similar to those of the interleave circuit 100, the same reference signs are applied thereto and explanations are omitted.

The address calculation circuit 420 calculates write addresses for writing data (input data) reordered by the interleave circuit 100 into the memory 130 and read addresses for reading out input data from the memory 130, for example. The address calculation circuit 420 calculates the write address of data using the following address calculation formula.

Write address=k×N+j j: Bit positions of n bits in data (0≤j≤n−1)

N: Number of pieces of n×n-bit data k: Position of n×n-bit data within block (0≤k≤N−1)

Compared to the address calculation formula used by the address calculation circuit 120 of the interleave circuit 100, this address calculation formula is a formula in which k and j are switched.

Figure 14:
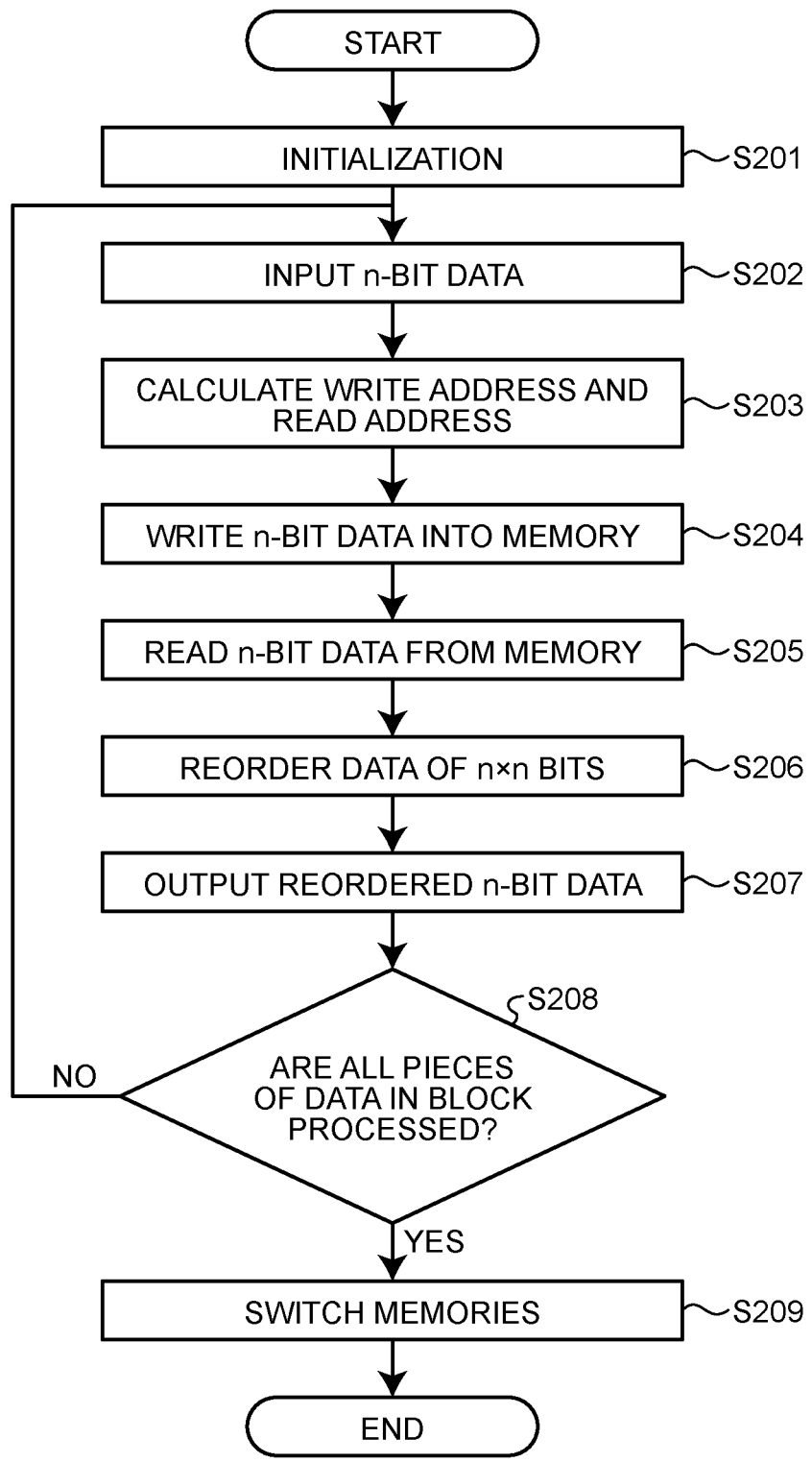
FIG. 14 is a flowchart of the deinterleave circuit.

Next, operations of the deinterleave circuit 400 will be described. FIG. 14 is a flowchart illustrating an operation example of the deinterleave circuit 400. FIG. 14 illustrates an example of an operation when processing a single block.

At the start of operation, the deinterleave circuit 400 initializes internal signals, write addresses, and read addresses (step S201). Thereafter, data is reordered while sequentially inputting n-bit input data (step S202 to step S207).

The deinterleave circuit 400 inputs n-bit input data (step S202).

Therefore, the address calculation circuit 420 calculates and updates the write address of the input data using the above address calculation formula (step S203). The address calculation circuit 420 also calculates the read address of the input data by incrementing by 1 from 0 as the initial value, for example. The deinterleave circuit 400 writes the input data into the memory 130 according to the calculated write address (step S204).

Figure 15:
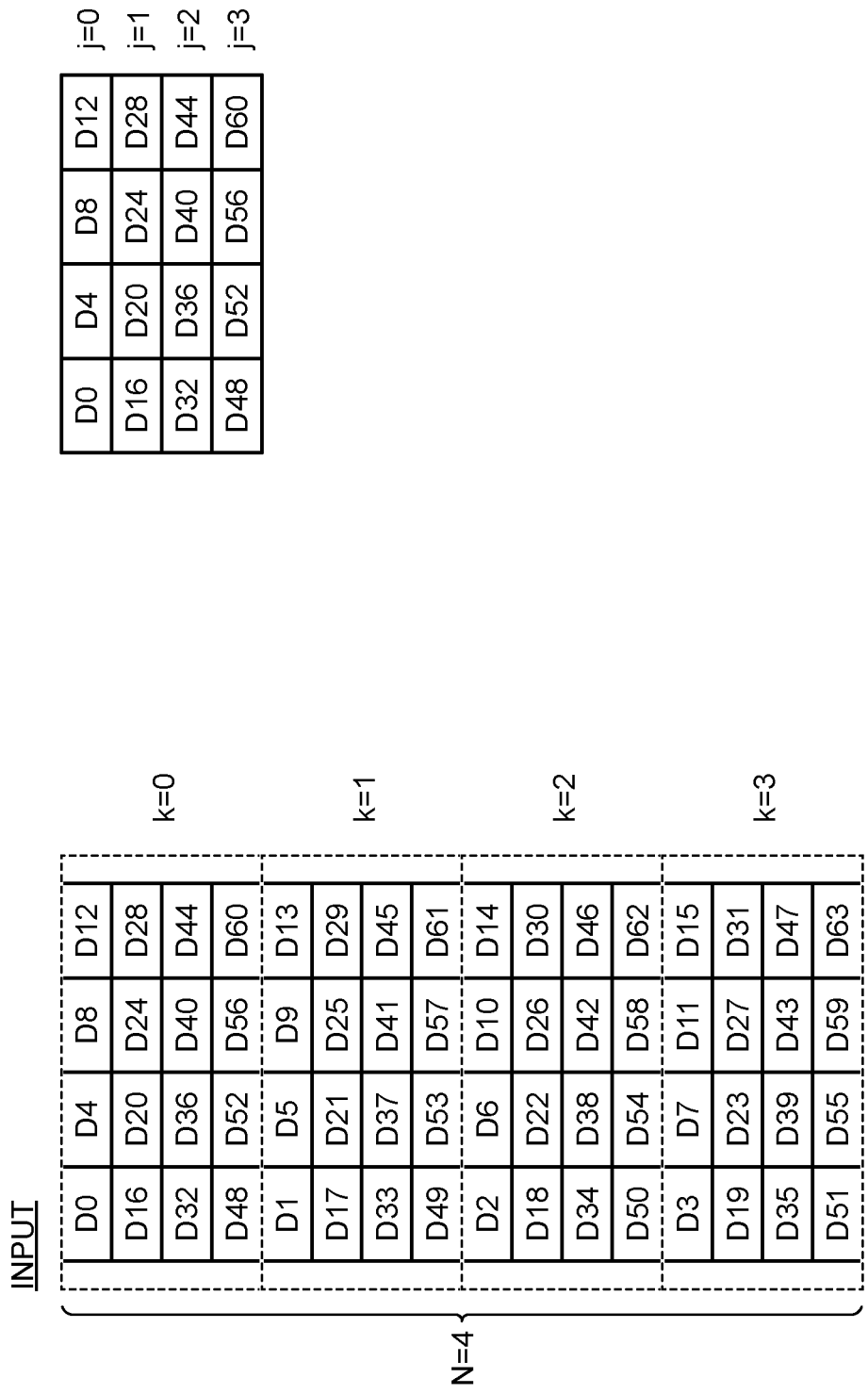
FIG. 15 is a diagram illustrating an example of input data input to the deinterleave circuit.

FIG. 15 is a diagram illustrating an example of input data input to the deinterleave circuit 400. Since the input data is the data reordered by the interleave circuit 100, it is the data arranged in the same order as the interleave-processed data illustrated in FIG. 12, for example.

FIG. 16 is a chart illustrating examples of write addresses calculated for the input data indicated in FIG. 15 and data (memory write data) written into the memory 130 according to the write addresses.

Returning to FIG. 14, the reordering circuit 110 reads n-bit input data from the memory 130 according to the read addresses calculated by the address calculation circuit 420 (step S205). The reordering circuit 110 reorders the input data in a unit of n×n bits sequentially read out from the memory, and outputs n-bit output data that is part of the reordering result (step S206, step S207).

The deinterleave circuit 400 determines whether all pieces of data in the block are processed (step S208). When all pieces of data in the block are not processed (No at step S208), the deinterleave circuit 400 returns to step S202 and repeats the processing for the next n-bit input data.

When all pieces of data are processed (Yes at step S208), the deinterleave circuit 400 switches the memory used for writing (the write memory) and the memory used for reading (the read memory) between the two memories 130a, 130b (step S209), and ends the operation.

When the reordering circuit 110 of the deinterleave circuit 400 executes reordering on the data of FIG. 16, for example, the data before being reordered by the interleave circuit 100 as indicated in FIG. 6 can be acquired.

According to the present embodiment, it is possible to perform reordering processing at a rate of n-bits/cycle by using the reordering circuit having n-bit parallel inputs and parallel outputs as well as the memories. By adjusting n, it is possible to achieve block interleave processing at a high throughput with a relatively small amount of flip-flops and a practical word size (n bits), even when the block size is large.

For example, there is a known technique in which the word size is defined to be n×m bits (n and m are a plurality of bits). For enabling high-speed operations, when n=m=512, the word size with this technique is 512× 512=262144 bits, which is difficult to be configured. In contrast, the word size with the present embodiment is n bits=512 bits, so the circuit can be configured within a practical range.

Second Embodiment

A second embodiment describes a case of using a relatively small-capacity storage device (a second storage device) and a relatively large-capacity storage device (a first storage device). Since the overall configuration of the communication device 10 is similar to that illustrated in FIG. 1 except that the interleave circuit 100 is changed to an interleave circuit 100-2, detailed explanations are omitted.

Figure 17:
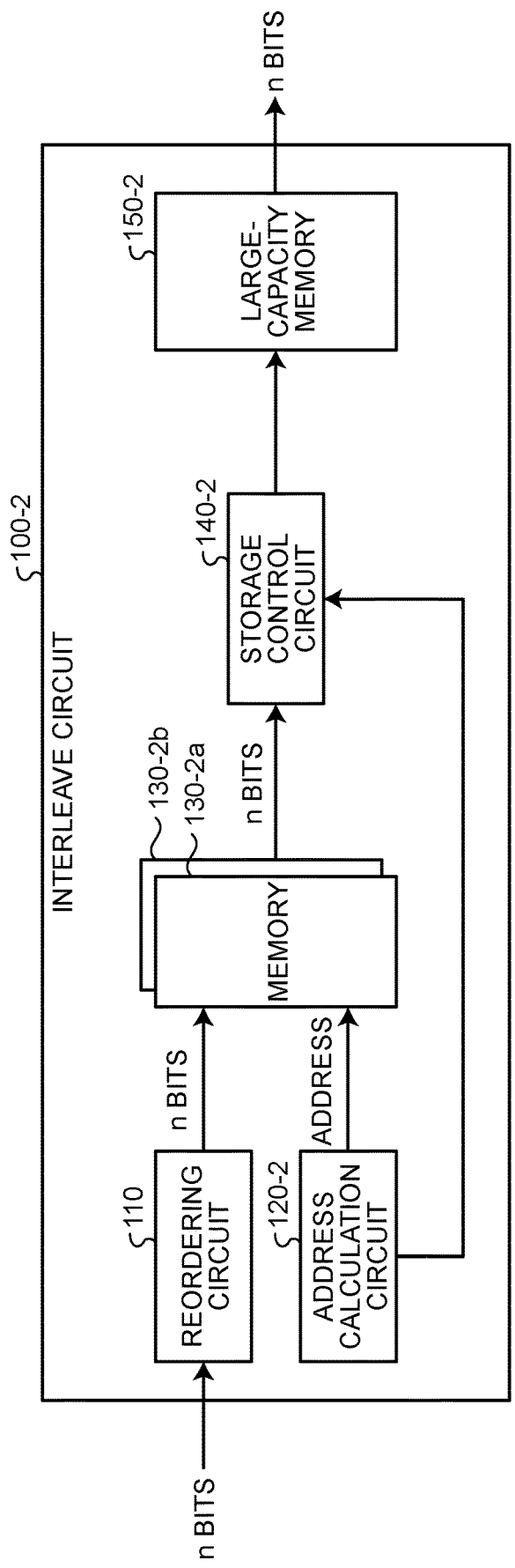
FIG. 17 is a block diagram of an interleave circuit according to a second embodiment.

FIG. 17 is a block diagram illustrating an example of the configuration of the interleave circuit 100-2 according to the second embodiment. As illustrated in FIG. 17, the interleave circuit 100-2 includes a reordering circuit 110, an address calculation circuit 120-2, memories 130-2a, 130-2b, a storage control circuit 140-2, and a large-capacity memory 150-2.

The second embodiment is different from the first embodiment in respect that functions of the address calculation circuit 120-2 and the memories 130-2a, 130-2b, as well as the storage control circuit 140-2 and the large-capacity memory 150-2 are added. Other configurations and functions are the same as those illustrated in FIG. 2 that is a block diagram of the interleave circuit 100 according to the first embodiment, so the same reference signs are applied and explanations are omitted herein.

The memories 130-2a and 130-2b are storage devices that store therein the output data reordered by the reordering circuit 110. For example, the memories 130-2a and 130-2b are configured to store therein data of half a block. The storage capacity of the memories 130-2a and 130-2b is not limited to half a block, but may also be 1/m of one block (m is an integer of 3 or more), for example.

The interleave circuit 100-2 performs a double buffer operation in which the memory used for writing (a write memory) and the memory used for reading (a read memory) are switched between the two memories 130-2a and 130-2b for each block.

The large-capacity memory 150-2 is a storage device (a first storage device) with a relatively larger storage capacity than those of the memories 130-2a and 130-2b. The large-capacity memory 150-2 is, for example, a storage device in a size capable of storing one block of data.

The memories 130-2a and 130-2b correspond to storage devices (second storage devices) with relatively smaller storage capacity than that of the large-capacity memory 150-2. Hereinafter, the memories 130-2a and 130-2b may be referred to as small-capacity memories.

The small-capacity memory is implemented by, for example, a static random-access memory (SRAM). The large-capacity memory 150-2 is implemented by, for example, a dynamic random-access memory (DRAM). Note that SRAM can generally read and write data faster than DRAM can, but it is more expensive than DRAM.

The address calculation circuit 120-2 calculates write addresses for writing output data to the memory 130-2 and read addresses for reading out output data from the memory 130-2. The address calculation circuit 120-2 also calculates write addresses for writing the data read out from the memory 130-2 into the large-capacity memory 150-2 and read addresses for reading out the data from the large-capacity memory 150-2. The calculation methods of the write address and read address to/from the large-capacity memory 150-2 are the same as those of the address calculation circuit 120 of the first embodiment.

The storage control circuit 140-2 controls processing of reading out the output data stored in the small-capacity memory and storing the read output data in the large-capacity memory 150-2. For example, the storage control circuit 140-2 writes the data read out from the small-capacity memory into the large-capacity memory 150-2 by burst transfer via a bus.

As described, the interleave circuit 100-2 of the present embodiment reorders and stores the data by a certain size (for example, half the size of one block) in the small-capacity memory, and writes the data read out from the small-capacity memory into the large-capacity memory 150-2. Since the data reordered to be continuous is stored in the small-capacity memory, it is possible to write the data into the large-capacity memory 150-2 at a high speed by burst transfer.

Figure 18:
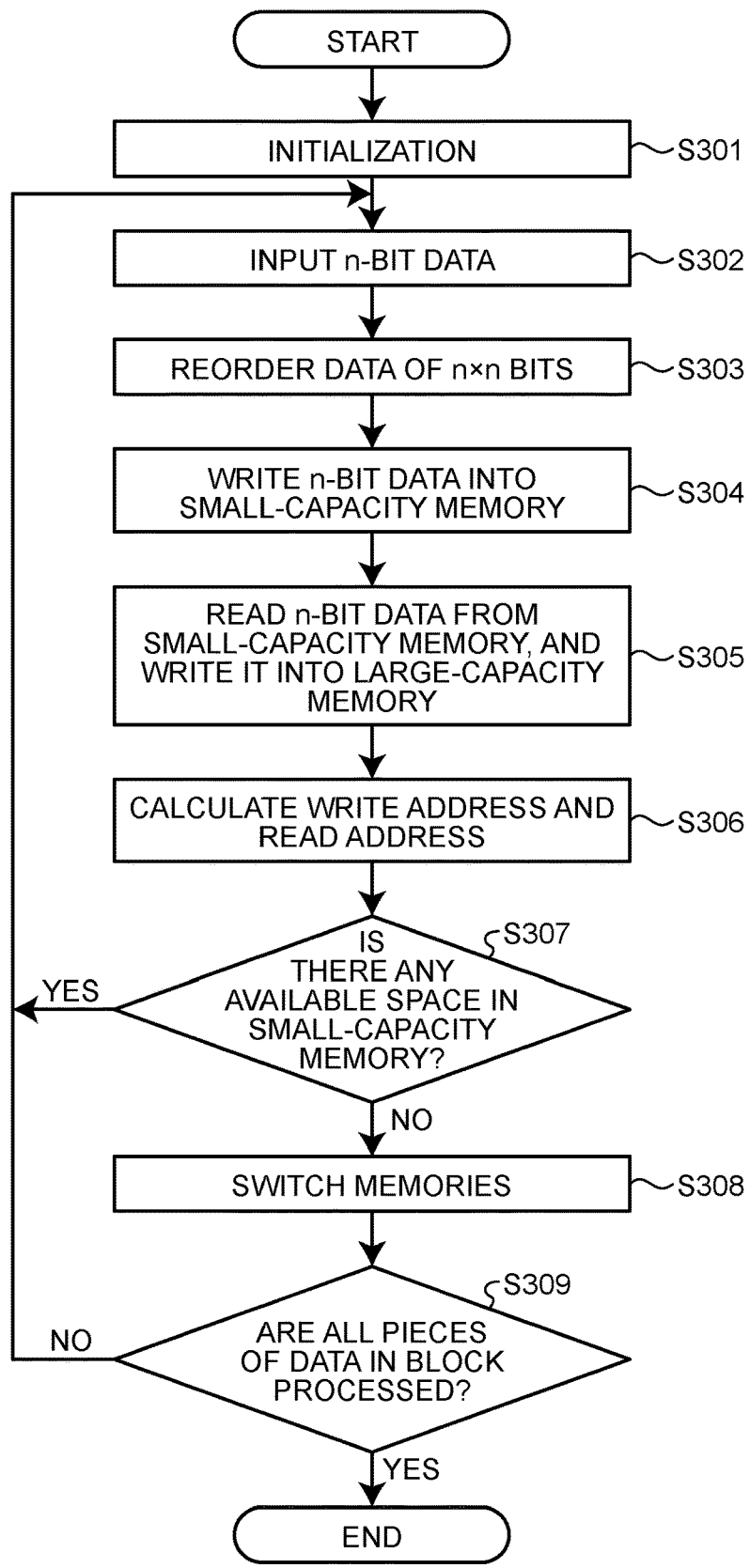
FIG. 18 is a flowchart of the interleave circuit according to the second embodiment.

Next, operations of the interleave circuit 100-2 according to the second embodiment will be described. FIG. 18 is a flowchart illustrating an operation example of the interleave circuit 100-2 according to the second embodiment. FIG. 18 illustrates an example of an operation when processing a single block.

Step S301 to step S303 are the same processing as step S101 to step S103 performed in the interleave circuit 100 according to the first embodiment, so the explanations thereof are omitted.

The reordering circuit 110 writes the n-bit output data to the write memory out of the small-capacity memories according to the write address calculated by the address calculation circuit 120-2 (step S304).

The storage control circuit 140-2 reads out n-bit data according to the read address calculated by the address calculation circuit 120-2 from, out of the small-capacity memories, the read memory where the output data reordered from data of half a block (partial data) is stored, and writes the read out data into the large-capacity memory 150-2 (step S305). At this time, the storage control circuit 140-2 may write the data into the large-capacity memory 150-2 by burst transfer.

The address calculation circuit 120-2 calculates and updates the write address and read address of the next data in the small capacity memory as well as the write address in the large-capacity memory 150-2 (step S306).

The interleave circuit 100-2 may perform pipeline processing for a series of such processing (step S302 to step S306). This allows each of the steps to be processed in one cycle for each n-bit data.

The interleave circuit 100-2 determines whether there is any available space in the small-capacity memory, that is, whether data occupying the storage capacity of the small-capacity memory is stored (step S307). When there is an available space in the small-capacity memory (YES at step S307), the interleave circuit 100-2 returns to step S302 and repeats the processing for the next n-bit input data.

When there is no available space in the small-capacity memory (NO at step S307), the interleave circuit 100-2 switches the memory used for writing (the write memory) and the memory used for reading (the read memory) between the two memories 130-2a and 130-2b (step S308).

The interleave circuit 100-2 determines whether all pieces of data in the block are processed (step S309). When all pieces of data in the block are not processed (No at step S309), the interleave circuit 100-2 returns to step S302 and repeats the processing for the next n-bit input data.

When all pieces of data in the block is processed (Yes at step S309), the interleave circuit 100-2 ends the operation.

Figure 19:
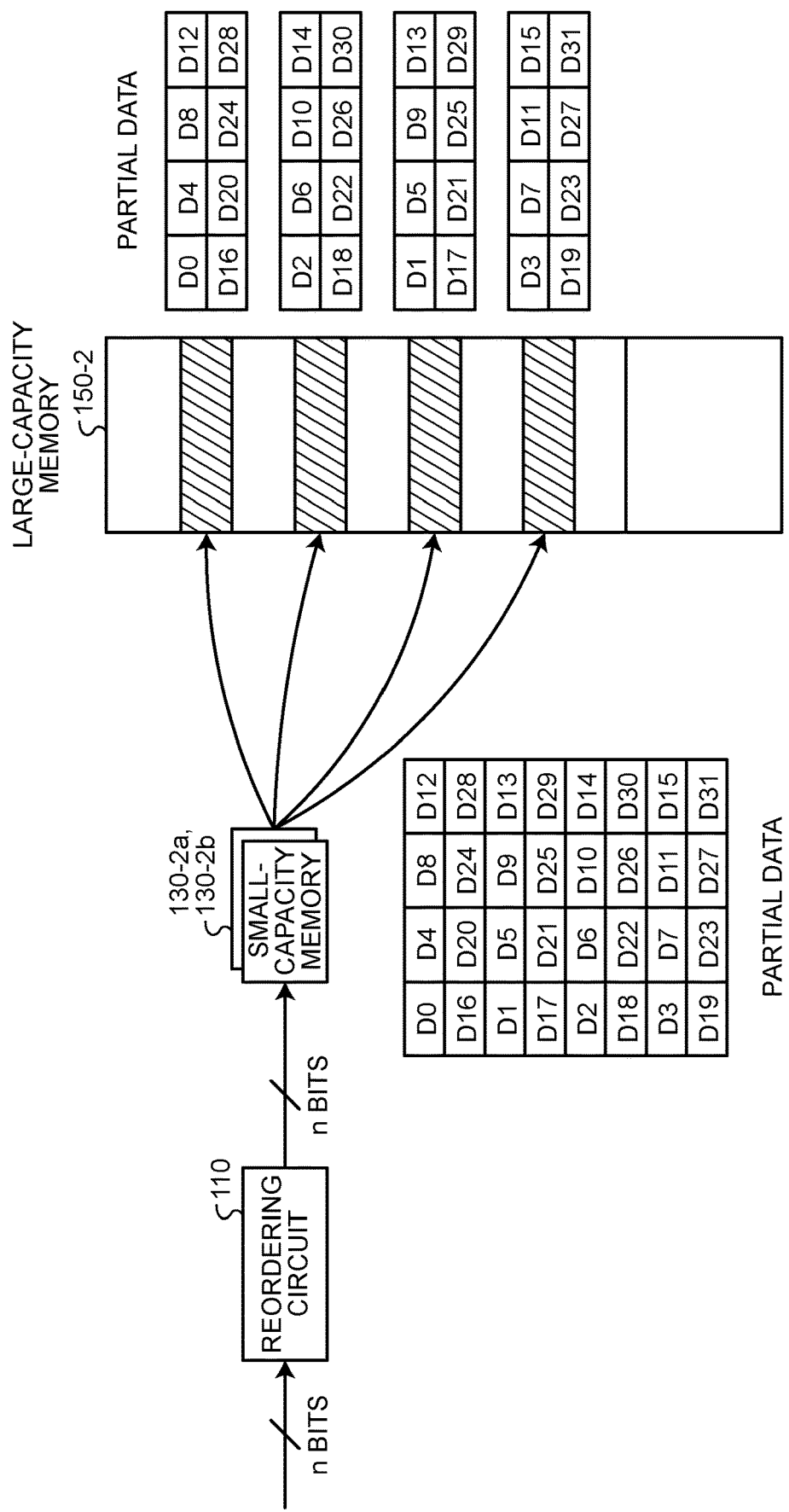
FIG. 19 is a diagram illustrating an example of n-bit data reordering.

FIG. 19 is a diagram illustrating an example of reordering n-bit data by using the small-capacity memories and the large-capacity memory 150-2. In the present embodiment, part of the data (partial data) of one block is reordered by using the small-capacity memory, and the partial data is written to the corresponding area of the large-capacity memory 150-2. This operation is repeated, and finally one block of reordered data is stored in the large-capacity memory 150-2.

Figures 20, 21:
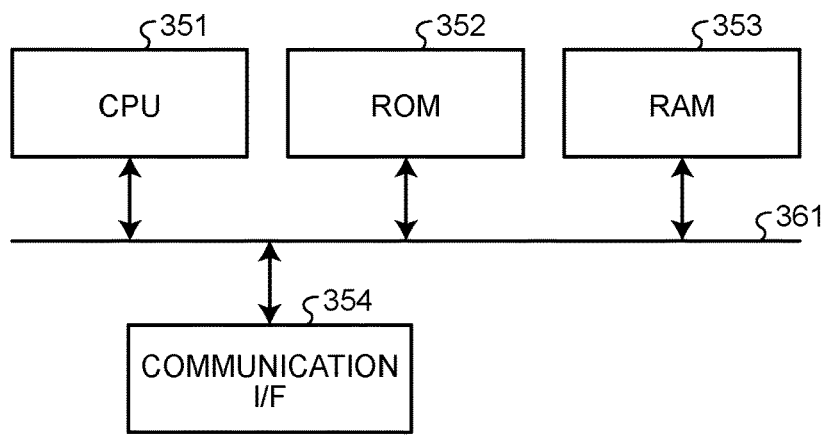
FIG. 20 is a chart illustrating relationships regarding output order, addresses, memory types, and data.
FIG. 21 is a block diagram of hardware of the communication device according to the first or second embodiment.

Next, an example of the calculation method of the write address in the small-capacity memory will be described by referring to FIG. 20. FIG. 20 is a chart illustrating relationships regarding the output order of output data by the reordering circuit 110, addresses in the large-capacity memory 150-2, addresses in the small-capacity memories, type of memory, and data after being interleave-processed.

The type of memory is information indicating which of the two small-capacity memories 130-2a and 130-2b is the small-capacity memory used as the write memory. Hereinafter, it is to be noted that a memory type "MA" means the memory 130-2a, and a memory type "MB" means the memory 130-2b.

In this example, the partial data that is half the one block data is reordered in the small-capacity memory and then written into the large-capacity memory 150-2. The addresses of the large-capacity memory 150-2 for each of the reordering circuit output orders can be calculated using the above address calculation formula.

The write addresses for writing the data of the reordering circuit output order numbers 1 to 8 into the memory 130-2a and writing the data of the reordering circuit output order numbers 9 to 16 into the memory 130-2b are the values listed in the small-capacity memory address columns in FIG. 20.

The address calculation circuit 120-2 calculates the value of the small-capacity memory address by the following formula (2), for example. Note that tempAddr is a write address of the large-capacity memory 150-2. A correction value b is defined to be a value 0 when the memory type is MA and 1 when the memory type is MB.

$$[tempAddr/2]+(tempAddr \bmod 2)-b \quad (2)$$

For example, for the data whose reordering circuit output order number in FIG. 20 is 15, the address is calculated as in the following formula (3). This value matches the corresponding value 5 in the small-capacity memory address column in FIG. 20.

$$[11/2]+(11 \bmod 2)-1=5+1-1=5 \quad (3)$$

The address calculation circuit 120-2 also calculates the read address of the small capacity memory by incrementing by 1 from 0 as the initial value, for example, for each of the two small-capacity memories.

As described, with the present embodiment, it is possible to perform a high speed operation while reducing the storage capacity of the memories 130-2a, 130-2b by treating the memories 130-2a, 130-2b (small-capacity memories) like caches. For example, the two memories 130 of the first embodiment in combination have a storage capacity of two blocks, whereas the small-capacity memories of the present embodiment have half the storage capacity thereof. In this case, it is possible to achieve block interleave processing at a high throughput at a rate of n-bits/cycle, unless the rate is limited when writing to the large-capacity memory 150-2.

As described above, with the first and second embodiments, it is possible to suppress reduction in the throughput and implement the interleave processing with a practical circuit configuration.

Next, a hardware configuration of the communication device according to the first or second embodiment will be described by referring to FIG. 21. FIG. 21 is an explanatory diagram illustrating an example of the hardware configuration of the communication device according to the first or second embodiment.

The communication device according to the first or second embodiment includes a control device such as a CPU 351, storage devices such as a read-only memory (ROM) 352 and a random-access memory (RAM) 353, a communication I/F 354 for performing communication by connecting to a network, and a bus 361 that connects each of the units.

A computer program executed by the communication device according to the first or second embodiment is provided by being loaded in advance on the ROM 352 or the like.

The computer program executed by the communication device according to the first or second embodiment may be configured to be provided as a computer program product in a file of an installable form or an executable form by being recorded on a computer-readable recording medium, such as a compact disc read-only memory (CD-ROM), a flexible disk (FD), a compact disc recordable (CD-R), or a digital versatile disc (DVD).

Furthermore, the computer program executed by the communication device according to the first or second embodiment may be provided by being stored on a computer that is connected to a network such as the Internet and downloaded via the network. Furthermore, the computer program executed by the communication device according to the first or second embodiment may be provided or distributed via a network such as the Internet.

The computer program executed by the communication device according to the first or second embodiment may cause a computer to function as each of the units of the communication device described above. The computer enables the CPU 351 to load the computer program on a main memory from the computer readable storage medium, so as to execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interleave circuit comprising:
   a reordering circuit configured to:
      for each cycle, receive in parallel n (n is an integer of 2 or more) bits contained in a piece of input data; and
      after receiving n-pieces of input data in n cycles, reorder the n-pieces of input data into n-pieces of output data, each piece of output data containing n bits received in cycles different from each other; and
   an address calculation circuit configured to calculate addresses for a first storage device for storing the n-pieces of output data, wherein
the reordering circuit includes, for each of the ith (0≤i≤n−1) bit positions of the input data, registers of (n+i) stages, each functioning as a shift register,
the reordering circuit includes n selection circuits,
a jth (0≤j≤n−1) selection circuit among the n selection circuits: is connected to registers of (n−j+i) stages among the registers of (n+i) stages corresponding to the ith (0≤i≤n−1) bit positions of the input data; and is configured to, in each of consecutive n cycles, select bits stored in registers different from each other among the connected registers, and
the reordering circuit outputs the output data containing n bits selected by the n selection circuits.

2. The circuit according to claim 1, further comprising:
a second storage device having a smaller storage capacity than a storage capacity of the first storage device, the reordering circuit storing the output data in the second storage device; and
a storage control circuit configured to read out the output data stored in the second storage device, and cause the first storage device to store the read out output data.

3. The circuit according to claim 1, wherein the address calculation circuit is configured to calculate the addresses so that the n-pieces of output data are respectively output from the first storage device in consecutive n cycles.

4. A communication device comprising:
an interleave circuit outputting output data that is reordered from input data; and
a processor configured to execute error correction on the output data,
the interleave circuit comprising:
a reordering circuit configured to:
for each cycle, receive in parallel n (n is an integer of 2 or more) bits contained in a piece of input data; and
after receiving n-pieces of input data in n cycles, reorder the n-pieces of input data into n-pieces of output data, each piece of output data containing n bits received in cycles different from each other; and
an address calculation circuit configured to calculate addresses for a first storage device for storing the n-pieces of output data,
wherein
the reordering circuit includes, for each of the ith (0≤i≤n−1) bit positions of the input data, registers of (n+i) stages, each functioning as a shift register,
the reordering circuit includes n selection circuits,
a jth (0≤j≤n−1) selection circuit among the n selection circuits: is connected to registers of (n−j+i) stages among the registers of (n+i) stages corresponding to the ith (0≤i≤n−1) bit positions of the input data; and is configured to, in each of consecutive n cycles, select bits stored in registers different from each other among the connected registers, and
the reordering circuit outputs the output data containing n bits selected by the n selection circuits.

5. The circuit according to claim 1, wherein
the address calculation circuit is configured to calculate the addresses including write addresses and read addresses,
the write addresses are addresses for writing the n-pieces of output data into the first storage device in consecutive n cycles,
the read addresses are addresses for reading out the n-pieces of output data from the first storage device independently from writing of the n-pieces of output data, and
an order of n bits data contained in the output data that is written into the first storage device by one of the write addresses is different from an order of n bits data contained in the output data that is read out from the first storage device by one of the read addresses.

6. The circuit according to claim 1, wherein
the address calculation circuit is configured to calculate the addresses including write addresses and read addresses, and
the write addresses are calculated by using formula (1) and the read addresses are calculated by incrementing by 1 from an initial value, $$\text{the write addresses} = j \times N + k \qquad (1),$$ or the read addresses are calculated by using formula (2) and the write addresses are calculated by incrementing by 1 from an initial value, $$\text{the read addresses} = j \times N + k \qquad (2),$$

where
j is a bit position of n bits in n×n-bit data (0≤j≤n−1),
N is the number of pieces of n×n-bit data within a block, and
k is a position of n×n-bit data within a block (0≤k≤N−1).

* * * * *